United States Patent
Kuno

(10) Patent No.: US 9,566,881 B2
(45) Date of Patent: Feb. 14, 2017

(54) VEHICLE SEAT

(71) Applicant: TOYOTA BOSHOKU KABUSHIKI KAISHA, Aichi-ken (JP)

(72) Inventor: Satoru Kuno, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/299,107

(22) Filed: Jun. 9, 2014

(65) Prior Publication Data
US 2014/0361591 A1    Dec. 11, 2014

(30) Foreign Application Priority Data

Jun. 10, 2013  (JP) ................................ 2013-121921

(51) Int. Cl.
*B60N 2/02* (2006.01)
*B60N 2/16* (2006.01)

(52) U.S. Cl.
CPC ..... *B60N 2/1695* (2013.01); *B60N 2002/0216* (2013.01)

(58) Field of Classification Search
CPC ....... A47C 3/029; A47C 3/027; A47C 3/0255; B60N 2/10; A47D 1/002
USPC .................... 297/258.1, 259.2, 259.3, 272.1, 260.1, 297/326, 327, 325
See application file for complete search history.

(56) References Cited

U.S. PATENT DOCUMENTS

| | | | | |
|---|---|---|---|---|
| 1,857,106 A | * | 5/1932 | Bishop | 248/393 |
| 1,880,497 A | * | 10/1932 | Saunders et al. | 297/452.18 |
| 1,938,435 A | * | 12/1933 | MacAllister | 248/393 |
| 4,408,798 A | * | 10/1983 | Mizushima et al. | 297/326 |
| 4,720,143 A | * | 1/1988 | Schwartz et al. | 297/326 |
| 5,154,402 A | * | 10/1992 | Hill et al. | 267/133 |
| 5,165,753 A | * | 11/1992 | Henderson | 297/326 |
| 5,498,051 A | * | 3/1996 | Sponsler et al. | 296/65.03 |
| 5,722,617 A | * | 3/1998 | Cecinas | 244/122 R |
| 5,730,492 A | * | 3/1998 | Warrick et al. | 297/216.2 |
| 6,036,266 A | * | 3/2000 | Massara | 297/328 |

(Continued)

FOREIGN PATENT DOCUMENTS

| | | |
|---|---|---|
| JP | 2012-158201 | 8/2012 |
| JP | 2013-67328 | 4/2013 |

OTHER PUBLICATIONS

U.S. Appl. No. 14/299,121 to Satoru Kuno, filed Jun. 9, 2014.

(Continued)

*Primary Examiner* — David R Dunn
*Assistant Examiner* — Alexander Harrison
(74) *Attorney, Agent, or Firm* — Greenblum & Bernstein, P.L.C.

(57) ABSTRACT

A vehicle seat including: a connection mechanism; a seat cushion connected to an interior structure of a vehicle via the connection mechanism and displaced between a first state and a second state at which the seat cushion is arranged at a position closer to a front part-side of the vehicle; and a seat back, wherein the connection mechanism includes an arm part and an attaching part, wherein a sitting surface of the seat cushion at the first state gradually inclines upwardly from the rear towards the front of the seat, and wherein, by inclining the arm part more forwards than at the first state, the seat cushion is displaced to the second state and a front part-side of the seat cushion is moved more downwardly than at the first state, whereby the sitting surface is made more horizontal.

2 Claims, 2 Drawing Sheets

(56) References Cited

U.S. PATENT DOCUMENTS

| | | | | |
|---|---|---|---|---|
| 6,089,652 | A * | 7/2000 | Miller, Sr. | 297/68 |
| 6,398,305 | B1 * | 6/2002 | Ball et al. | 297/328 |
| 6,896,309 | B2 * | 5/2005 | Satoh et al. | 296/65.09 |
| 7,100,983 | B1 * | 9/2006 | Gant | 297/314 |
| 7,134,720 | B2 * | 11/2006 | Viger | 297/270.1 |
| 8,276,868 | B2 * | 10/2012 | Chang | 248/419 |
| 2005/0099047 | A1 * | 5/2005 | Elterman et al. | 297/326 |
| 2011/0127794 | A1 * | 6/2011 | Lindsay | 296/65.05 |
| 2012/0025573 | A1 * | 2/2012 | Lin | 297/258.1 |
| 2012/0112517 | A1 * | 5/2012 | Hoffman et al. | 297/85 L |
| 2014/0327282 | A1 * | 11/2014 | Crum | 297/259.2 |

OTHER PUBLICATIONS

Office Action issued in Japan Counterpart Patent Appl. No. 2013-121921, dated Aug. 10, 2016, along with an English translation thereof.

\* cited by examiner

VEHICLE SEAT

CROSS-REFERENCE TO RELATED APPLICATIONS

This application claims priority from Japanese Patent Application No. 2013-121921 filed on Jun. 10, 2013, the entire contents of which are incorporated herein by reference.

TECHNICAL FIELD

The invention relates to a vehicle seat moveable inside a vehicle interior.

BACKGROUND

As this type of vehicle seat, a vehicle seat having a seat cushion, a seat back erecting from the seat cushion and a connection mechanism (a seat rail and a slide rail) has been known (see JP-A-2012-158201).

In the related-art technology, the seat rail is mounted on a floor surface at a rear-side of an instrument panel and extends in a longitudinal direction of the vehicle interior. At this state, the slide rail at a lower part of the seat cushion is mounted to the seat rail, so that the vehicle seat is mounted to be slidable on the floor surface while facing the instrument panel. As for a large passenger, the vehicle seat is slid rearwards and is thus spaced from the instrument panel. Also, as for a small passenger, the vehicle seat is slid forwards and is thus made to come close to the instrument panel.

In this type of seat configuration, it is preferable to adapt an angle of a sitting surface of the seat cushion to a bent shape of leg parts of a passenger, considering the sitting comfort of the seat.

For example, upon the sitting, the leg parts of the passenger are bent into a substantially inverted V shape, where the femoral regions face upwards, are bent downwardly at knee parts and extend towards the lower of the instrument panel (a pedal).

Thus, the sitting surface of the seat cushion is made to be gradually inclined upwardly from the rear of the seat towards the front of the seat, in conformity to a large passenger, for example. In this way, the large passenger can sit while naturally bending the leg parts.

According to the above related-art technology, the vehicle seat is moved forwards and rearwards with the angle of the sitting surface being fixed. For this reason, the sitting comfort may be deteriorated when the vehicle seat is slid forwards in conformity to a small passenger.

That is, the small passenger cannot bring a foot into contact with the pedal unless the inclined angle of the femoral region is made to be gentler than the large passenger. For this reason, when the angle of the sitting surface of the seat cushion is made to adapt to the large passenger, the small passenger sits on the seat while strongly pressing the femoral region on the sitting surface (the interference with the sitting surface is large).

The angle of the sitting surface can be made to be gentle in conformity to the small passenger. However, in this case, the sitting comfort for the large passenger will be degraded (for example, a gap is generated between the femoral regions and the sitting surface). At this time, the seat may be further moved rearwards to adapt the bending degrees of the leg parts of the large passenger to those of the small passenger. However, the rearward movement is limited due to an interior space.

SUMMARY

According to the related-art technology (the angle of the sitting surface is fixed), the angle of the sitting surface of the seat cushion is typically set in conformity to an average body size of the passenger so as to correct the above problems. However, in this case, the angle of the sitting surface is not optimal for both the large passenger and the small passenger, so that the sitting comfort is deteriorated for both passengers.

The invention has been made keeping in mind the above situations, and an object of the invention is to effectively change an angle of a sitting surface of a seat cushion in conformity to a state displacement of a vehicle seat.

According to an aspect of the present invention, there is provided a vehicle seat including: a connection mechanism; a seat cushion connected to an interior structure of a vehicle via the connection mechanism and configured to be displaced between: a first state; and a second state at which the seat cushion is arranged at a position closer to a front part-side of the vehicle than at the first state; and a seat back erectably connected to the seat cushion, wherein the connection mechanism includes: an arm part extending downwardly from the seat cushion, and an attaching part rotatably attaching an end portion of the arm part to the interior structure, wherein the connection mechanism is configured to displace the seat cushion in a pendulum form between the first state and the second state by a rotating operation of the arm part with the attaching part serving as a base point, wherein a sitting surface of the seat cushion at the first state gradually inclines upwardly from the rear of the seat towards the front of the seat, and wherein, by inclining the arm part more forwards than at the first state, the seat cushion is configured to be displaced to the second state and a front part-side of the seat cushion is configured to be moved more downwardly than at the first state, whereby the sitting surface of the seat cushion is made more horizontal at the second state than at the first state.

Accordingly, at the first state, the sitting surface is gradually inclined upwardly from the rear of the seat towards the front of the seat by the connection mechanism. Thereby, it is possible to adapt an angle of the sitting surface at the first state to a relatively large passenger. Also, at the second state, the sitting surface is made more horizontal than at the first state by the tilting operation of the arm part, that is, by a relatively simple configuration). Thereby, it is possible to adapt the angle of the sitting surface at the second state to a relatively small passenger.

Accordingly, it is possible to effectively change an angle of a sitting surface of a seat cushion in conformity to a state displacement of a vehicle seat.

DETAILED DESCRIPTION

Hereinafter, illustrative embodiments for implementing the present invention will be described with reference to FIGS. 1 to 2. In the respective drawings, the front of a vehicle seat is denoted with a symbol F, the rear of the vehicle seat is denoted with a symbol B, the upper of the vehicle seat is denoted with a symbol UP and the lower of the vehicle seat is denoted with a symbol DW.

Figure 1:
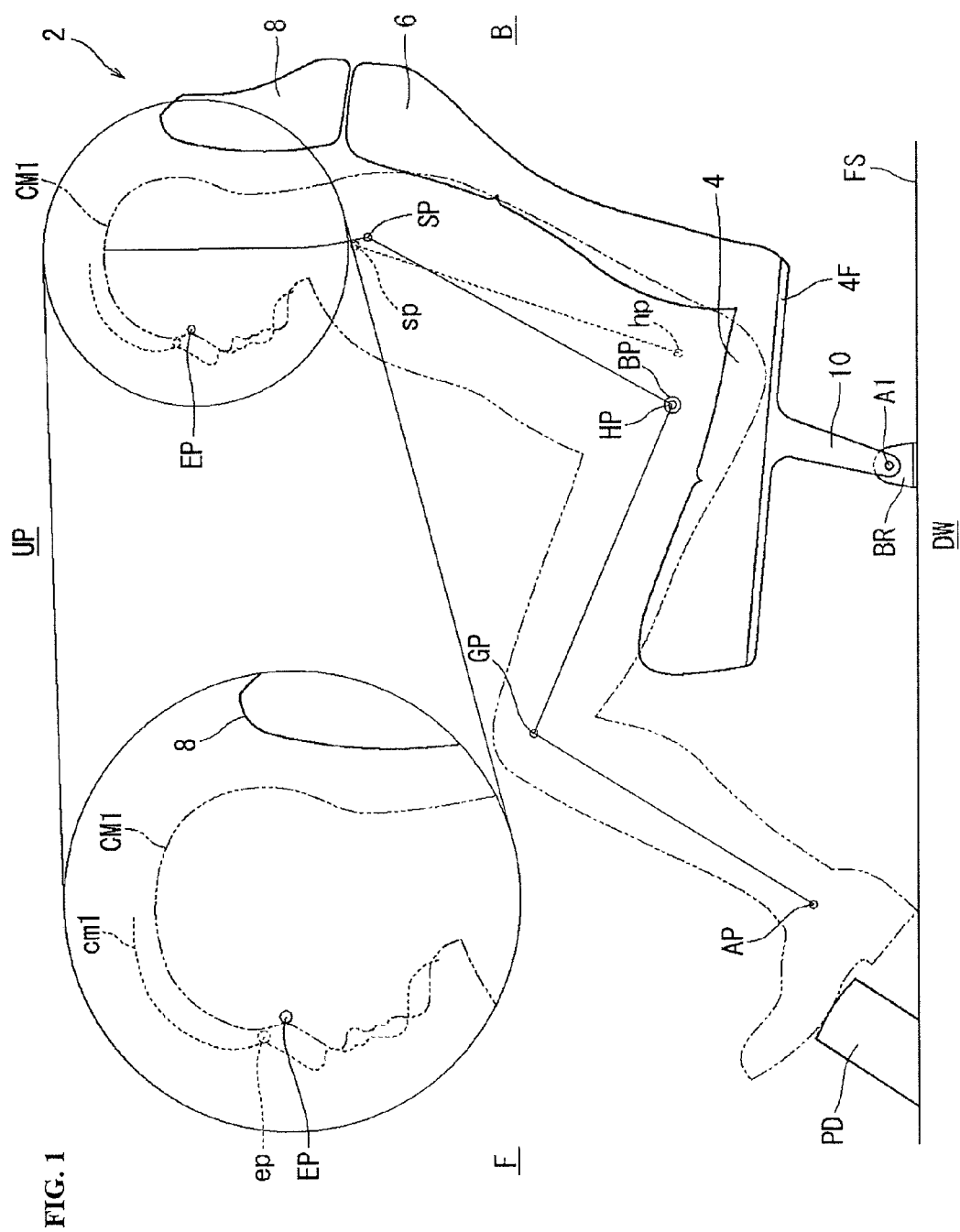
FIG. 1 is a schematic side view of a vehicle seat at a first state according to a first illustrative embodiment.

In this illustrative embodiment, a floor surface FS (a substantially flat floor surface), an instrument panel (not shown) and a vehicle seat 2 are provided in a vehicle interior (refer to FIG. 1). The instrument panel is arranged at a front part-side of a vehicle and a pedal PD is arranged at a lower side of the instrument panel.

The vehicle seat 2 has a seat structure member (a seat cushion 4, a seat back 6 and a headrest 8) and a connection mechanism, which will be described later. The seat back 6 is connected to a rear part of the seat cushion 4 so that it can be erected and laid down. Also, the headrest 8 is connected to an upper part of the seat back 6 in an erected state.

In this illustrative embodiment, the seat structure member 4, 6, 8 is arranged above the floor surface FS via the connection mechanism (which will be described in detail later) and is displaced between a first state and a second state (see FIGS. 1 and 2). As for the vehicle seat 2 at the first state shown in FIG. 1, the seat structure member is moved to a rear part of the vehicle and is thus spaced from the instrument panel (which is an arrangement position suitable for a large passenger). Also, as for the vehicle seat 2 at the second state shown in FIG. 2, the seat structure member is moved more to a front part of the vehicle than at the first state and comes close to the instrument panel (which is an arrangement position suitable for a small passenger).

In the above-described seat configuration, it is preferable that an angle (which will be described in detail later) of a sitting surface of the seat cushion 4 can be changed depending on the respective states, in conformity to a body size difference of the passengers.

Thus, in this illustrative embodiment, the angle of the sitting surface of the seat cushion 4 at a horizontal state is adapted to an average body size of a passenger, and the angle of the sitting surface of the seat cushion is gradually inclined upwardly from the rear of the seat towards the front of the seat. Also, by a configuration to be described later, the angle of the sitting surface of the seat cushion 4 is effectively changed in conformity to the state displacement of the vehicle seat 2. Hereinafter, the respective configurations will be described in detail.

[Connection Mechanism]

Figure 2:
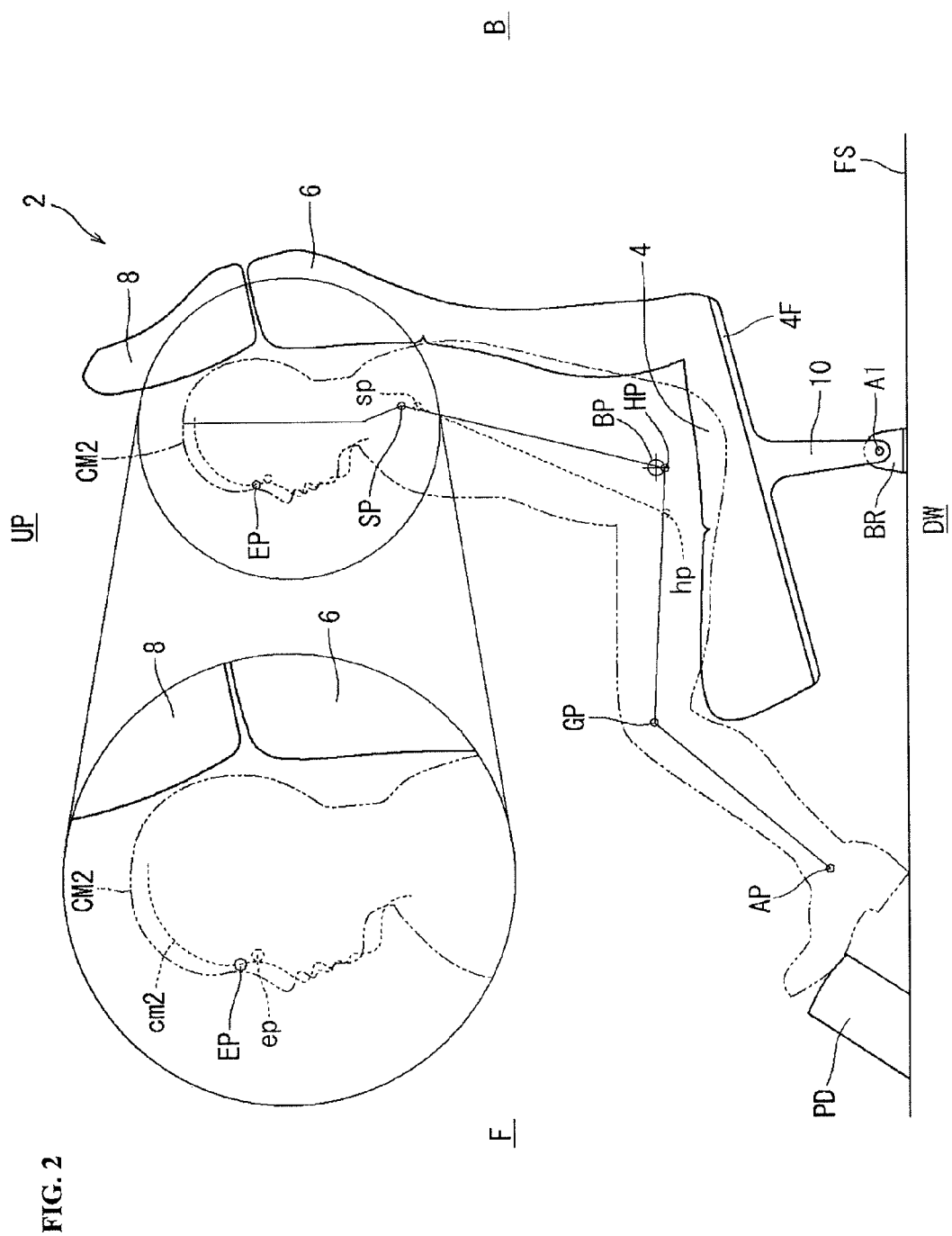
FIG. 2 is a schematic side view of the vehicle seat at a second state according to the first illustrative embodiment.

In this illustrative embodiment, the connection mechanism includes an arm part 10 of the seat cushion 4 and a bracket BR (which is an example of the attaching part) (see FIGS. 1 and 2).

The arm part 10 is a flat plate-shaped part (having a substantial I shape, when seen from the side) and extends from a substantial center of a back surface of the seat cushion 4 (a seat frame 4F) towards the floor surface FS. Also, the bracket BR is a flat plate member protruding from the floor surface FS, and an end portion of the arm part 10 can be rotatably attached thereto.

In this illustrative embodiment, the seat structure member is arranged at the position of the first state while the front part-side of the seat cushion 4 is arranged at a slightly higher position than the rear part-side of the seat cushion 4. At this time, the arm part 10 gradually inclines rearwards from the lower towards the upper (a rearward tilted posture) and a lower end of the arm part 10 is rotatably attached to the bracket BR via a rotational shaft A1. The arm part 10 is configured to be gradually erected (configured to be rotated), as it is displaced from the first state to the second state with the rotational shaft A1 serving as a base point.

[Vehicle Seat at First State]

Referring to FIG. 1, the seat structure member is set at the first state and is arranged while being spaced from the instrument panel (a position suitable for a large passenger) by the connection mechanism. At this time, in this illustrative embodiment, the arm part 10 is kept at the rearward tilted posture by a lock mechanism (not shown), so that the seat structure member can be set at the first state.

Also, in this illustrative embodiment, the arm part 10 is kept at the rearward tilted posture, so that the front part of the seat cushion 4 is arranged at a higher position that the rear part thereof. Therefore, the sitting surface of the seat cushion 4 can be made to gradually incline upwardly from the rear of the seat towards the front of the seat (the inclined angle is larger than the horizontal state), in conformity to the large passenger. Also, as the seat cushion 4 is inclined, the seat back 6 is somewhat inclined rearwards. Thereby, it is possible to enable the large passenger to sit with the upper half body of the passenger being somewhat inclined rearwards.

A first model CM1 (corresponding to AM 95 of the SAE standard) imitating the large passenger is prepared and is made to naturally sit on the vehicle seat 2.

At this time, the first model CM1 is enabled to sit so that an upper half body (a shoulder part SP) is slightly inclined rearwards and hips (hip point HP) are deeply buried at the rear part of the seat cushion 4. Leg parts of the first model CM1 are bent into a substantially inverted V shape, so that the femoral regions are inclined forwards and upwards from the hip points HP (seat reference point BP). Also, front parts of the femoral regions are bent forwards and downwards at knee parts GP and ankle parts AP extend towards the pedal. At this time, the femoral regions are arranged along the sitting surface of the seat cushion 4 and are appropriately put on the seat cushion 4 (i.e., it is possible to appropriately keep a relationship between the large passenger and the seat).

Also, the upper half body (the shoulder part SP) is slightly inclined rearwards and the hips (hip points HP) are deeply buried at the rear part of the seat cushion 4, so that it is possible to prevent positions of eye parts EP (eye lines) from getting higher beyond necessity.

Here, problems of the related art (where the angle of the sitting surface is fixed) at the first state are supplementarily described.

In the related art, the angle of the sitting surface of the seat cushion 4 is set in conformity to an average body size of the passenger (for example, the angle is set to be an intermediate inclination angle of the first state and the second state in this illustrative embodiment).

In the configuration of the related art, the angle of the sitting surface of the seat cushion 4 at the first state is gentler than this illustrative embodiment and the seat back 6 is somewhat erected.

For this reason, according to the configuration of the related art, since it is necessary to avoid a separation between the femoral regions and the sitting surface as much as possible at the first state, the hip points hp of the first model cm1 (small letters are used to distinguish with the illustrative embodiment) are arranged at a somewhat rear part. At this state, since the first model cm1 sits on the seat cushion 4 with the upper half body (the shoulder part sp) being somewhat erected, the positions of the eye parts ep (eye lines) get higher more than necessary.

[Vehicle Seat at Second State]

Next, the seat structure member is set at the second state and is arranged to be close to the instrument panel (a position suitable for the small passenger) by the connection mechanism (refer to FIG. 2).

At this time, in this illustrative embodiment, the arm part 10 is more inclined forwards than at the first state with the rotational shaft A1 (the bracket BR) serving as a base point and is thus erected, and the seat structure member is displaced in a pendulum form. The arm part 10 is kept at the erected posture by the lock mechanism (not shown), so that the seat structure member can be arranged to be close to the instrument panel (the second state).

Also, in this illustrative embodiment, the angle of the sitting surface of the seat cushion 4 is adapted to the small passenger by the connection mechanism.

In this illustrative embodiment, as the arm part 10 is erected, the seat cushion 4 is moved in a pendulum form, so that the front part of the seat cushion 4 is inclined (moved) downwardly and the rear part of the seat cushion 4 is inclined (moved) upwardly. In this way, it is possible to set the sitting surface of the seat cushion 4 at a more horizontal state than the first state, in conformity to the small passenger. Also, as the seat cushion 4 is made horizontal, the seat back 6 is more erected than the first state. Thereby, the small passenger can sit with erecting the upper half body.

A second model CM2 (corresponding to JF 05 of the SAE standard) imitating the small passenger is prepared and is made to naturally sit on the vehicle seat 2.

At this time, the second model CM2 is enabled to sit so that an upper half body (a shoulder part SP) is erected and hips (hip points HP) are lightly buried at the rear part of the seat cushion 4. The femoral regions are inclined (more gently inclined than the first model CM1) forwards and upwards from the hip points HP (located slightly below the seat reference points BP). At this time, the femoral regions are arranged along the relatively horizontal sitting surface of the seat cushion 4 and is appropriately buried into the seat cushion 4 (i.e., it is possible to appropriately keep a relationship between the small passenger and the seat).

Also, the upper half part (the shoulder part SP) is erected and the hips are lightly buried at the rear part of the seat cushion 4, so that it is possible to prevent positions of the eye parts EP (eye lines) from getting lower beyond necessity.

Here, problems of the related art (where the angle of the sitting surface is fixed) at the second state are supplementarily described.

In the related art, as described above, the angle of the sitting surface of the seat cushion 4 is set in conformity to an average body size of the passenger, so that the angle of the sitting surface at the second state is steeper than this illustrative embodiment.

In the configuration of the related art, in order to avoid excessive interference between the femoral regions and the sitting surface at the second state, the second model cm2 sits at a somewhat shallow state (the hip points hp are located at a somewhat front part). For this reason, since the second model cm2 sits with the upper half part (the shoulder part sp) being somewhat inclined rearwards, the positions of the eye parts ep (eye lines) get lower more than necessary.

As described above, in this illustrative embodiment, the sitting surface of the seat cushion 4 at the first state gradually inclines upwards from the rear of the seat towards the front of the seat and thus can adapt to the relatively large passenger. Also, the sitting surface of the seat cushion 4 at the second state is made to be more horizontal than at the first state and thus can adapt to the relatively small passenger. Here, in this illustrative embodiment, the seat configuration member can be displaced from the first state to the second state by the rotating operation of the arm part 10, that is, by a relatively simple configuration.

Therefore, according to this illustrative embodiment, it is possible to effectively change the angle of the sitting surface of the seat cushion 4 in conformity to the state displacement of the vehicle seat 2.

The vehicle seat of the present invention is not limited to the above illustrative embodiment and can adopt other various illustrative embodiments. (1) In the above illustrative embodiment, at the first state, the entire seat cushion is arranged to be inclined relative to the horizontal state (that is, the front part faces upwards and the rear part faces downwards). However, at the first state, the seat cushion may be horizontally arranged and only the sitting surface may be set at an inclination angle adapted to the large passenger. (2) Also, in the above illustrative embodiment, the vehicle seat is arranged in the rear of the instrument panel. However, the vehicle seat may be arranged in the rear of other various members such as another vehicle seat. Also, in the above illustrative embodiment, the connection mechanism is attached to the floor surface. However, the connection mechanism may be attached to various interior structures such as a vehicle interior wall. (3) Also, in the above illustrative embodiment, the arm part 10 is displaced from the rearward tilted posture to the erected posture. However, it should not be construed to limit the operation of the arm part. For example, the arm part may be displaced from the erected posture to the forward tilted posture, thereby displacing the seat structure member from the first state to the second state. Also, the configuration (the shape, the size and the arrangement position) of the arm part can be appropriately changed depending on the configuration of the seat.

(4) Also, in the above illustrative embodiment, the arm part 10 and the bracket BR (the attaching part) are attached via the rotational shaft A1. However, it should not be construed to limit the method of attaching the arm part and the bracket. For example, an end portion of the arm part may be made to be irregular and may be attached with being engaged with an irregularity of an upper side of the bracket. Then, the arm part may be rotated with the end portion of the arm part and the upper part of the bracket being engaged with each other. (5) The configuration of the above illustrative embodiment can be applied to various vehicle seats of a vehicle, an airplane, a train and the like. Meanwhile, in the above illustrative embodiments, the configuration of the vehicle seat has been exemplified. However, the configuration of the vehicle seat can be appropriately changed (for example, the headrest can be omitted).

What is claimed is:

1. A vehicle seat comprising:
  a connector;
  a seat cushion connected to an interior structure of a vehicle via the connection and configured to be displaced between: a first state; and a second state at which the seat cushion is arranged at a position closer to a front part-side of the vehicle than at the first state; and
  a seat back erectably connected to the seat cushion,
  wherein the connection mechanism includes:
    an arm part extending downwardly from the seat cushion, and
    an attaching part rotatably attaching an end portion of the arm part to the interior structure, the end portion of the arm part and the attaching part positioned substantially centrally of the seat cushion in a front to rear direction of the vehicle, wherein the end portion of the arm part is attached to the attaching part via a rotational shaft at substantially the center of the seat cushion in the front to rear direction of the vehicle, wherein the connector is configured to displace the seat cushion in a pendulum form between the first state and the second state by a rotating operation of the arm part with the rotational shaft serving as a base point, wherein a sitting surface of the seat cushion at the first state gradually inclines upwardly from the rear of the seat towards the front of the seat, wherein, by inclining the arm part more forwards than at the first state, the seat cushion is configured to be displaced to the second state and a front part-side of the seat cushion is configured to be moved more downwardly than at the first state, whereby the sitting surface of the seat cushion is made more horizontal at the second state than at the first state, wherein the first state is a first sitting state, wherein the second state is a second sitting state, and wherein, in each of the first sitting state and the second sitting state, an angle of the sitting surface of the seat cushion is maintained by locking the arm portion.

2. The vehicle seat according to claim 1, wherein the seat back is configured to be more erect at the second state than at the first state.

* * * * *